June 13, 1967  J. R. SCHLEY ETAL  3,325,305
VAPOR DIFFUSION COATING PROCESS

Filed Oct. 21, 1963  2 Sheets-Sheet 1

INVENTORS
JOHN R. SCHLEY
BY ROBERT B. PUYEAR

ATTORNEY

INVENTORS
JOHN R. SCHLEY
ROBERT B. PUYEAR

ATTORNEY

United States Patent Office 3,325,305
Patented June 13, 1967

3,325,305
VAPOR DIFFUSION COATING PROCESS
John R. Schley and Robert B. Puyear, Kokomo, Ind., assignors to Union Carbide Corporation, a corporation of New York
Filed Oct. 21, 1963, Ser. No. 317,833
4 Claims. (Cl. 117—107.2)

The present invention relates to the application of diffused metallic coatings to metal articles.

More particularly, the present invention relates to a vapor diffusion coating process which provides an improvement over the processes disclosed in U.S. Patents 3,079,276 and 3,096,160, the disclosures of which are incorporated herein by reference.

The processes described in the aforementioned patents broadly involve the embedding of metal articles in prealloyed charge material and heating the charge and articles at elevated temperatures in the presence of a halide carrier with the exclusion of air.

The resulting diffusion coated articles are characterized by high resistance to oxidation and erosion which make these articles suitable for use in stringent application such as vanes, blades and other gas turbine components, blast furnace tuyeres, hot pressing dies, exhaust valves and the like.

It has been found, however, that many present day requirements demand even higher oxidation and erosion resistance and together with a very smooth and uniform coating which is free from heterogeneous inclusions.

It is therefore an object of the present invention to provide an improved vapor diffusion coating process for the production of metal articles having highly uniform coatings and superior resistance to oxidation and erosion.

Figure 1:
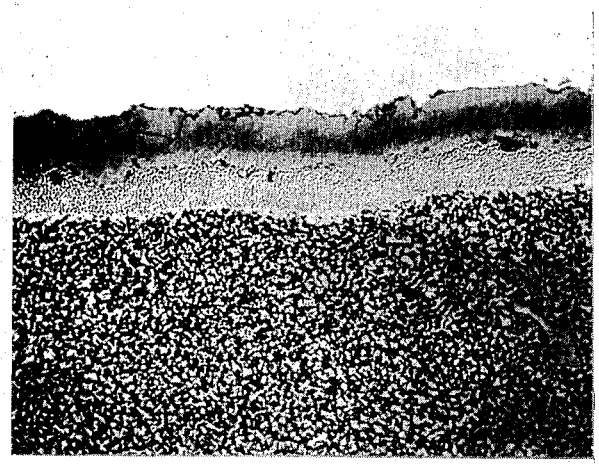
Figure 2:
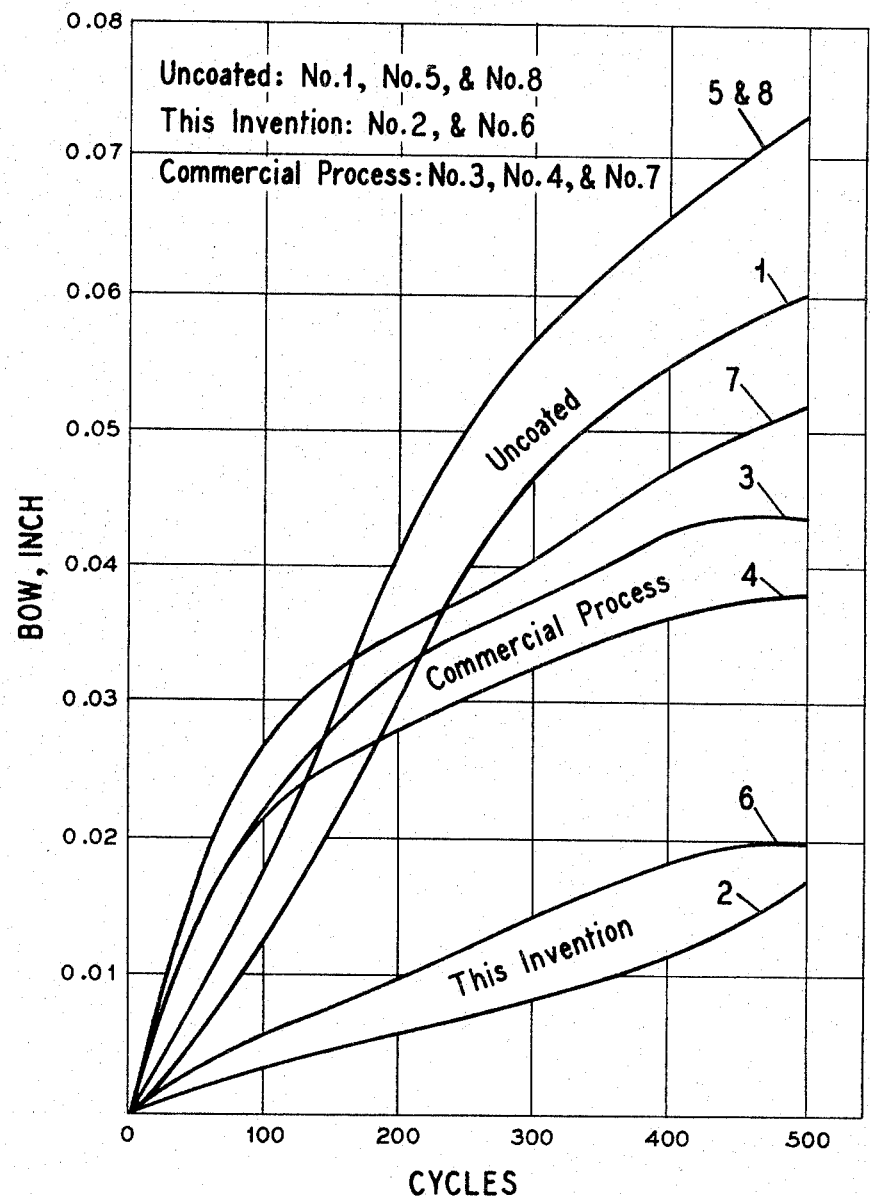

Other objects will be apparent from the following description and claims in conjunction with the drawing which shows in FIGURE 1 a photomicrograph (original magnification 400×) of a cross-section of a diffusion coated metallic article produced in accordance wtih the present invention and in FIGURE 2 a graph showing the improvement in thermal shock resistant properties which is characteristic of articles prepared in accordance with the present invention.

A process in accordance with the present invention for producing coated metal articles comprises embedding the articles to be coated in a mixture of prealloyed particulated charge material and silicon carbide and heating the mixture and embedded articles at elevated temperatures with the exclusion of air in the presence of halide carrier material.

It has been discovered, as part of the present invention, that the incorporation of particulated silicon carbide in a diffusion coating pack material of prealloyed charge and halide carrier provides unexpected improvements in the diffusion coated metallic article which is ultimately produced. Silicon carbide, when present in the pack mixture within the range hereinafter disclosed behaves as an active reagent which functions as a co-depositing charge material. The prealloyed charge materials provide aluminum and either iron or nickel in the resulting diffused coating of the metal articles while the silicon carbide provides silicon. Thus, the coatings on the substrate articles are tertiary alloys, i.e. nickel-aluminum-silicon or iron-aluminum-silicon depending on whether the prealloyed charge material is a nickel-aluminum or iron-aluminum alloy.

The presence of silicon carbide in the mixture, which results in silicon being alloyed into the coating, provides a number of improvements including the following:

(1) Only one heating step is required in the deposition process. Recommended temperature ranges for processing various substrate articles have been established and are disclosed hereinbelow.

(2) The deposited coatings are highly uniform and substantially free from heterogeneous inclusions as shown for example in the FIGURE 1.

(3) Silicon in the coating composition results in a high quality coating that endures the effects of use under adverse conditions of heat, wear, atmosphere and stresses to a much higher extent than has been previously obtainable.

(4) Silicon in the coating composition results in a more chemically stable coating since the silicon serves to retard further diffusion of the coating into the substrate article after the processing is completed and during prolonged exposure to high-temperature conditions.

As previously mentioned, the present invention provides improved results as compared to the vapor diffusion coating processes of United States Patents 3,079,276 and 3,096,160. In the techniques of these patents, articles composed of either nickel, cobalt, iron or copper base alloys can be provided with a nickel aluminum or iron aluminum coating by means of a process which broadly comprises (1) embedding the article to be coated in a prealloyed charge material consisting essentially of from 15 to 37 percent by weight aluminum, balance substantially all nickel or iron and incidental impurities and (2) heating the charge material and contained articles in the presence of a carrier material selected from the group consisting of ammonium halides, aluminum halides and nickel halides, the heating being conducted with the exclusion of air.

The present invention constitutes an improvement of the aforedescribed process steps by the additional step of adding particulated silicon carbide to the charge material.

A suitable range for the silicon carbide constituent of the resulting pack material in the practice of the present invention is between 20 and 85 percent by weight of the aggregate of prealloyed charge, carrier and silicon carbide. A suitable range for the carrier material is from 0.25 percent to 3 percent of the aggregate of prealloyed charge, silicon carbide, and carrier.

In practicing this embodiment of the present invention the operating equipment described in U.S. Patent 3,079,276 can be effectively employed. For example, a charge of particulated prealloyed iron-aluminum or nickel-aluminum alloy is prepared and mixed with particulated silicon carbide and carrier. The mixture of charge material, silicon carbide, and carrier is placed in a heat-resistant retort and the metal articles to be coated are embedded in the carrier-charge-silicon carbide mixture. The preferred composition of the prealloyed charge is either 70% Ni, 30% Al or 70% Fe, 30% Al. A preferred sizing of the charge and silicon carbide is that which passes a No. 60 mesh sieve (United States Screen series). In general sizes from minus 20 to minus 150 mesh are suitable. After the air is exhausted from the retort, it is suitably sealed and the contents are heated to between 1400° F. and 2200° F. for a time sufficient to provide the desired coating thickness. As a result of practicing the aforedescribed process using silicon carbide as a reagent, it has been found that the diffusion coating obtained actually contains silicon.

As will be shown hereinafter a Fe–Al–Si deposited coating is superior to a Fe–Al coating and the presence of silicon in the coating is highly beneficial. The characteristic distribution of silicon across the cross section of the deposited area of articles coated in accordance with the present invention is especially noteworthy. By way of example, a coated article of this invention was prepared by treating a substrate of the N–1 alloy shown in Table A hereinbelow, with a prealloyed charge material of 70 Fe–30 Al. Table A hereinbelow shows a tabulation of alloys which are effectively coated in the practice of the present invention.

The charge proportions used were 49.5% prealloyed (70–30) Fe–Al, 49.5% silicon carbide, 0.8% ammonium bromide and 0.2% aluminum chloride. The N–1 alloy articles were embedded within the charge mixture in a container and the container was then heated to 1700° F. for 18 hours with the exclusion of air. After cooling the thus treated articles, a sample coated article was sectioned and tested for silicon content and silicon distribution across the coating area. The silicon determination was performed with an electron beam microanalyzer and the results obtained are shown in the following Table I.

TABLE I

| | Silicon Distribution | | |
|---|---|---|---|
| | Thickness, in microns | Cumulative Depth, in microns | Silicon Content, Weight Percent |
| New surface | | 0 | 0.7 to 0.9.[1] |
| Overlay surface zone | 32 | 32 | .4 to .6. |
| Original surface (interface) | 3.6 | 35.6 | 1.0 (minimum). |
| Diffusion zone | 21 | 56.6 | .8 to 1.0. |
| Unaffected substrate | [2]25 | 81.6+ | .4 to .6. |

[1] After extended use or heating at elevated temperatures the silicon content at the surface will decrease to about 0.4 to 0.6 on account of oxidation and diffusion.
[2] Over.

The microanalyzer indicated that the new surface and the overlay surface zone consisted essentially of about 30% Al, 70% Fe with a silicon content as shown. The diffusion zone consisted essentially of the alloy N–1 with iron, aluminum, and the amount of silicon as shown. The unaffected substrate consists of the original N–1 alloy with silicon at its original level of about .5% by weight.

The presence of the highest concentration of silicon at the interface (original surface) provides an unexpected improvement since it appears that under these circumstances the silicon acts as a buffer that retards the further diffusion of the deposited coating into the substrate alloy during prolonged use at high temperature. Table II shows the long-time oxidation resistance of N–1 alloy in three conditions: (1) uncoated, (2) coated with 30 Al–70 Fe without silicon carbide in the mixture, and (3) coated with 30 Al–70 Fe with silicon carbide in the mixture according to the practice of this invention. The results of this test indicate the stability of the silicon-containing coating of this invention.

TABLE II.—LONG-TIME OXIDATION TEST RESULTS OF ALLOY N–1 AT 1900° F.

| Type | By Weight Change, Mg./cm.$^2$ | | | |
|---|---|---|---|---|
| | 23 Hr. | 46 Hr. | 92 Hr. | 500 Hr. |
| (1) Uncoated | 0.0 | −1.0 | ([1]) | ([1]) |
| (2) Coated by Process of U.S.P. 3,079,276 | +0.4 | +0.8 | +0.8 | +1.7 |
| (3) Coated by Process of This Invention | +0.2 | +0.4 | +0.1 | +0.3 |

[1] Test terminated because of heavy attack of uncoated specimen.

Further oxidation tests were conducted with samples prepared as shown in Table III. The oxidation tests were performed at a temperature of 2100° F. for 16 to 32 hours. The testing method is well known in the art and is described in U.S. Patent 3,079,276. Oxidation rate is measured by the weight change of the test samples following exposure at high temperatures.

TABLE III

| Test Number | Substrate Alloy | Coating Method | Coating Composition | Temperature, °F. | Time, Hours | Oxidation Weight Change, Mg./cm.$^2$ |
|---|---|---|---|---|---|---|
| 1 | N–1 | Preferred practice of U.S. Patent 3,079,276 | Ni–Al | 2,100 | 16 | +0.6 |
| | | | | 2,100 | 32 | +1.1 |
| 2 | N–1 | As per Example I, of this invention | Ni–Al–Si | 2,100 | 16 | +0.2 |
| | | | | 2,100 | 32 | +0.2 |
| 3 | C–1 | Preferred practice of U.S. Patent 3,096,160 | Fe–Al | 2,100 | 16 | −2.2 |
| 4 | C–1 | As per Example V, of this invention | Fe–Al–Si | 2,100 | 16 | +0.6 |

The foregoing oxidation test data show that the method of this invention produces a coating that is highly oxidation resistant. Further, as shown in the tables, the oxidation rate for coated articles in accordance with the present invention not only is lower, but remains substantially constant during prolonged exposure. This is considered to be due to the presence of silicon in the final coating. As previously stated, the silicon acts as a buffer that retards further diffusion and provides a more chemically stable coating.

Embodiments of the process of this invention have been effectively performed on a wide variety of substrate metal articles and Table A shows a typical listing of various alloys that have been successfully coated by the process of this invention. Table B hereinbelow shows the preferred parameters for each class of substrate article i.e., nickel base, iron base, copper base and cobalt base. In general, the four best practice embodiments may be defined as containing about 49.5% prealloyed charge material 70 Fe, 30 Al or 70 Ni–30 Al, about 49.5% silicon carbide, about 1 percent carrier material from the group ammonium bromide and aluminum chloride in the charge mixture and heating from about 1550° F. to about 2000° F. for about 12 to 18 hours. All other processing equipment and processing steps, including the removal of air from the reaction environment, are essentially as described in U.S. Patents 3,079,276 and 3,096,160.

In general, nickel base copper base and cobalt base alloys as substrates may be suitably coated at temperatures as shown below in Table IV.

TABLE IV

| | Nickel Base Alloys | Copper Base Alloys | Cobalt Base Alloys |
|---|---|---|---|
| Temperature Range, °F | 1,600–1,800 | 1,400–1,650 | 1,800–2,150 |
| Times, hours | 14–22 | 14–20 | 8–16 |

Through experimentation, it was found that the desired coating thickness may be predicted by the proper control of temperature and time. The following Table V has been established as a guide to control coating thickness. The data indicate that as the chromium and nickel contents increase, the rate of coating deposition decreases.

The article shown in the drawing was produced in the manner hereinafter described in Example I.

In contrast with the article of the present invention, the coated articles shown in the drawings of the previous- TABLE V.—COATING THICKNESS, IN MILS, OBTAINED UNDER VARIOUS TEMPERATURES FOR 16 HOURS

| Iron-Base Alloy | Nominal Composition [1] | Temperature | | | | |
| --- | --- | --- | --- | --- | --- | --- |
| | | 1,600° F. | 1,700° F. | 1,800° F. | 1,900° F. | 1,975° F. |
| 1020 Steel | .2 C–6 Mn | 4.0–5.3 | 7.2–8.5 | 10.3–11.7 | 13.5–14.8 | |
| Type 304 S.S. | 18 Cr–8 Ni | 1.3–2.5 | 4.3–5.5 | 7.3–8.0 | 10.3–11.6 | 13.4–14.6 |
| Type 309 S.S. | 23 Cr–13 Ni–1 Mn | 1.6–2.4 | 3.7–4.5 | 5.7–6.3 | 7.0–8.4 | 11.0–13.4 |
| Type 310 S.S. | 25 Cr–21 Ni | 1.2–1.8 | 2.7–3.3 | 4.2–4.9 | 6.3–7.2 | 8.1–9.0 |
| Type 316 S.S. | 18 Cr–8 Ni–3 Mo | 1.6–2.4 | 3.6–4.4 | 5.6–6.7 | 8.7–10.2 | 11.5–12.8 |
| Type 410 S.S. | 12 Cr | 2.7–4.8 | 7.0–8.5 | 10.7–12.2 | | |
| Type 430 S.S. | 16 Cr | 2.0–3.0 | 4.5–5.5 | 7.0–8.0 | 9.5–10.5 | 11.4–12.4 |
| Type 446 S.S. | 25 Cr | | 2.7–4.0 | 5.8–7.0 | 8.5–9.5 | 10.5–11.7 |
| 8 NiCoMo Maraging Steel | 18 Ni–8 Co–4 Mo–.5 Ti | 1.3–1.7 | 2.3–2.7 | 3.3–3.8 | 5.0–6.0 | 7.0–7.8 |
| MULTIMET [2] alloy | 20 Ni–19 Co–21 Cr–3 Mo | 0.9–1.1 | 1.3–1.5 | 1.7–1.8 | 2.0–2.3 | 2.5–2.6 |

[1] Alloys may contain minor amounts of other elements, i.e., carbon, silicon, manganese, columbium, tantalum, etc; the balance is iron for all alloys.
[2] Trademark of Union Carbide Corporation.

Both the time and temperature of the diffusion step can vary because of the variables involved; therefore, the time and temperature ranges shown hereinabove are merely suggested for best results. As a convenience to establish the optimum time and temperature for any given conditions, the following information may be helpful.

A. As expected, to obtain thicker coatings the processing temperature may be higher or the time at temperature may be longer or both.

B. In general, for economic considerations the lowest processing temperature and the shortest processing time that yield an effective coating are preferred.

C. The highest processing temperature is limited by the melting point of the article to be coated. Although usually not necessary, a heat-treatment following the coating deposition may be used to strengthen the substrate alloy.

D. No limitation has been found for the ratio: volume of pack material/surface of article to be coated. It was found that an effective coating is deposited provided that at least a continuous layer of blended pack material surrounds each article to be coated.

In a series of tests to determine the optimum carrier material, it was found that most of the materials known to be carrier agents were effective when used in the process of this invention. Such materials as ammonium halides, aluminum halides, nickel halides and the like are commonly used as carrier materials in vapor-diffusion processes. Further, it was found that more than one carrier material may be used in a vapor-diffusion operation. For example, .8 percent ammonium bromide and .2 percent aluminum chloride were used together in one coating step. The results were equally suitable when 1 percent of ammonium bromide was used singly. Effective coatings have been obtained within the range of about .25 percent to 3 percent carrier material.

A still further and highly important benefit of the process of the present invention is that the coating obtained is much more uniform than those previously obtained. For example, the inclusion of heterogeneous particles in the coating is reduced and practically eliminated. This benefit thus avoids the presence of inclusions at the surface of the coated article. Also, the absence of inclusions in the body of the coating tends to improve the overall properties of the coated articles.

With reference to FIG. 1 in the present application it can be seen that the coated article, therein illustrated, is practically free from heterogenous inclusions. The area 1 indicated in the drawing represents generally the overlay surface zone; area 2 shows the diffusion zone and area 3 is the original substrate.

ly mentioned United States Patents 3,079,276 and 3,096,160 can be seen to contain a relatively large number of inclusions, which are most noticeable at the surfaces of the articles.

An additional benefit of the present invention is that the process materials are reusable. There are known vapor-diffusion processes that may use less expensive raw materials in the pack mixture for a single run and the mixture must then be discarded or, if at all practical, arduously processed for re-use at additional cost. The pack mixture of this invention is immediately and completely reusable (except for the addition of a small amount of material which is normally consumed during each run). None of the ingredients in the pack mixture of this invention are chemically altered in a manner that prevents immediate re-use of the pack mixture. In the process of this invention, it is not uncommon that a particular pack mixture is still effectively reusable after 10 complete runs.

The following examples are provided to further illustrate the present invention.

*Example I*

Articles having the composition of N–1 alloy were embedded in a mixture of 49.5% prealloyed 70 Fe–30 Al material, 49.5% silicon carbide, .8% ammonium bromide and .2% aluminum chloride. The prealloyed 70 Fe–30 Al material was prepared as described in U.S. Patent No. 3,079,276 and was particulated to about minus 60 mesh. The actual particle size distribution was:

| | Percent |
| --- | --- |
| –60 +100 | 36.3 |
| –100 +150 | 19.4 |
| –150 +200 | 12.8 |
| –200 +250 | 5.0 |
| –250 +270 | 4.7 |
| –270 +325 | 4.1 |
| –325 | 17.7 |

The silicon carbide was also particulated to about minus 60 mesh and the particle size distribution was similar to that of the prealloyed material. The two halide carrier materials which were used were commercially available C.P. grade chemicals particulated to about minus 100 mesh and finer. The four ingredients were mixed in a twin-cone-type blender for about one hour. The N–1 alloy articles were grit blasted and degreased in an acetone bath prior to embedding in the mixture. As a general precaution, the articles after degreasing are handled only when wearing cloth gloves. The articles were placed in a retort as described in U.S. Patent 3,079,276 in such a manner that each article is completely embedded in the above-mentioned mixture.

The retort was then placed in a furnace and heated to about 1700° F. for 18 hours with the exclusion of air.

After the heating step, the retort was permitted to cool to below about 200° F. and the articles were removed from the retort. The resultant articles required only a slight brushing with a soft bristle brush to remove any adhering particles of the mixture. The coated articles were then washed in a dilute ammonium hydroxide solution and rinsed in clear water and dried. A photomicrograph of an article prepared as above is shown in FIGURE 1. The silicon distribution in the article was as previously shown in Table I.

*Example II*

A diffusion coated article was prepared following the procedure of Example I except that the composition of the prealloyed material was 70 percent nickel and 30 percent aluminum instead of 70 percent iron and 30 percent aluminum. The resultant article had a smooth surface and was substantially free from heterogeneous inclusions. The silicon distribution was similar to that of the article of Example I.

*Example III*

A diffusion coated article was prepared following the procedure of Example I except that the substrate article was iron base alloy F-4 and the halide carriers were 0.2% ammonium bromide and 0.8% aluminum chloride and the heating step was 16 hours at 1800° F. The resultant article had a smooth surface and was substantially free from heterogeneous inclusions. The silicon distribution was similar to that of the article of Example I.

*Example IV*

A diffusion coated article was prepared following the procedure of Example I except that the substrate article was electrical grade copper, the halide carriers were 0.5% ammonium bromide and 0.5% aluminum chloride, and the heating step was 16 hours at 1550° F. The resultant article had a smooth surface and was substantially free from heterogeneous inclusions. The silicon distribution was similar to that of the article of Example I.

*Example V*

A diffusion coated article was prepared following the procedure of Example I except that the substrate article was cobalt base alloy C-1, one percent aluminum chloride was used as the halide carried, and the heating step was 12 hours at 2000° F. The resultant article had a smooth surface and was substantially free from heterogeneous inclusions. The silicon distribution was similar to that of the article of Example I.

Articles coated by the process of this invention are characterized by high resistance to extreme conditions of wear, thermal shock, erosion, stresses at high temperature, impingement of hot gases and the like. An example of this environment is the operating conditions of gas turbine engines.

To stimulate actual environmental conditions of blades and vanes in a gas turbine engine, a standard test apparatus and test procedure were used to determine the thermal-shock properties of various specimens. Briefly, the test is described as follows: Eight airfoil-shaped specimens are mounted on a hub, which rotates at 1725 r.p.m. and travels between a furnace and a water-spray quenching station at preset time intervals. Each cycle consists of 60 seconds exposure in the furnace, which operates at 2100° F., and 90 seconds cooling in the water spray. After each 100 cycles, the test is halted, the weight change and deformation measured, and the specimens examined for cracking. Five hundred cycles constitute a complete test.

In their original form the eight specimens used were cast of a cobalt-base alloy having the composition of the substrate of alloy C-2, i.e., 21 percent chromium, 11 percent tungsten, 2 percent columbium plus tantalum, 0.5 percent carbon, 2 percent iron and incidental impurities, bal. cobalt. The specimens were mounted on the hub in the order of their specimen number, after being processed as follows:

Group X ____ Specimens Nos. 1, 5, and 8, as-cast and not coated.
Group Y ____ Specimens Nos. 2 and 6, coated with the process of this invention, as described in Example V.
Group Z ____ Specimens Nos. 3, 4, and 7, coated by a well-known commercial process.

The deformation or bow is determined by the actual measured dimensional deviation from the original shape resulting from the thermal-shock conditions of the test. The standard airfoil-shaped specimens, one-inch wide and two-inches long, are measured for deviation at 1.85 inches from the hub. The graph of FIGURE 2 plotted from data derived from this test clearly shows that the specimens processed in accordance with the present invention are superior in resisting deformation resulting from thermal shock.

Additionally, after the 500-cycle test, the weight loss of each specimen was obtained. The weight loss, shown in Table VI, and given in percent of original weight, is a measure of oxidation and erosion attack during the dynamic conditions of the test.

TABLE VI

|  | Specimen No. | Percent Weight Loss |
| --- | --- | --- |
| Group X | 1 | 0.55 |
|  | 5 | 0.50 |
|  | 8 | 0.52 |
| Average |  | 0.52 |
| Group Y | 2 | 0.036 |
|  | 6 | 0.041 |
| Average |  | 0.038 |
| Group Z | 3 | 0.050 |
|  | 4 | 0.072 |
|  | 7 | 0.065 |
| Average |  | 0.062 |

These data show that specimens in Group Y, processed in accordance with the present invention, are superior in resistance to oxidation and erosion under dynamic thermal-shock conditions.

Another series of tests using the thermal shock testing method described above was conducted. In this test, specimens of N-1 alloy were tested. Group A-I were articles coated by the process similar to Example I of this invention, and Group B-I were articles coated by the process of U.S. Patent 3,079,276 (i.e., without silicon carbide). Both groups withstood the thermal shock and erosive conditions of the test; however, the specimens were additionally tested for oxidation resistance. Results were as shown in Table VII.

TABLE VII.—Oxidation Test Results after 500 cycles at 1,900° F.

| Group | Deformation | Failure due to Cracks | Erosion | Oxidation Weight Loss in percent |
| --- | --- | --- | --- | --- |
| A-I | Nil to trace | None | Nil | 0.26 |
| B-I | Trace | ___do___ | Nil | 0.44 |

Further testing of the articles coated by the process of this invention indicates that the articles are greatly improved in some properties and not adversely affected in other properties. This is an important consideration since some coating processes now used in the art often cause the article to lose valuable properties resulting from the processing steps.

Table VIII shows the average results of stress rupture tests. The coated test specimens were treated essentially as described in Example I. The data shows that the process treatment of this invention generally improves stress rupture properties.

shows that fatigue properties are improved when an article is coated by the process of this invention. All specimens were machined from bars cast from the same heat for each alloy.

TABLE VIII.—STRESS RUPTURE TEST RESULTS

| Alloy | Test Conditions | | Coated by the Process of this invention | | | As cast—Not coated | | |
|---|---|---|---|---|---|---|---|---|
| | Temp., °F. | Stress, p.s.i. | Life, Hrs. | Elongation, percent | Reduction of Area, percent | Life, Hrs. | Elongation, percent | Reduction of Area, percent |
| N-1 | 1,700 | 30,000 | 89.6 | 7.8 | 16.8 | 74.2 | 6.7 | 11.8 |
| | 1,650 | 38,000 | 57.0 | 7.9 | 13.8 | 54.3 | 5.5 | 7.8 |
| | 1,600 | 45,000 | 75.3 | 5.6 | 6.4 | 50.5 | 5.2 | 7.0 |
| N-2 | 1,900 | 14,500 | 224.1 | 15.0 | 19.1 | 168.2 | 6.3 | 7.8 |
| | 1,850 | 19,000 | 163.9 | 8.0 | 17.6 | 163.7 | 3.9 | 6.4 |
| | 1,800 | 25,000 | 154.3 | 10.0 | 17.6 | 132.3 | 8.4 | 14.7 |
| N-3 | 1,800 | 10,000 | 426.9 | 25.5 | 23.8 | 334.2 | 31.0 | 38.1 |
| | 1,700 | 22,000 | 170.0 | 20.5 | 31.8 | 151.4 | 22.5 | 34.4 |
| | 1,600 | 30,000 | 377.5 | 20.0 | 33.4 | 279.4 | 15.0 | 26.9 |
| N-4 | 1,900 | 13,000 | 210.1 | 9.0 | 9.5 | 180.3 | 5.1 | 6.3 |
| | 1,800 | 22,000 | 128.9 | 6.3 | 6.3 | 122.2 | 8.4 | 7.1 |
| | 1,750 | 28,000 | 82.3 | 4.8 | 4.8 | 7.1 | 2.7 | 5.5 |

The following Table IX shows average fatigue data for two nickel-base alloys, each of which were coated essentially as in Example I. Uncoated alloys were also tested. The test used measures the number of repeated reversed bending stresses at high speed, until failure. The test was conducted on a Krouse rotating beam testing machine under standard operating conditions. The data

TABLE IX

| Alloy | Stress, p.s.i. | Rotating Speed, r.p.m. | Average cycles to Failure | |
|---|---|---|---|---|
| | | | Coated by the Process of This Invention | Uncoated As Cast |
| N-3 | 25,000 | 8,000 | [1] 31,536,400 | [1] 26,047,320 |
| N-4 | 25,000 | 8,000 | [2] 31,782,500 | [2] 19,207,600 |

[1] Average of 4 tests.
[2] Average of 5 tests.

The mesh sizes referred to herein are United States Screen series.

TABLE A

| Alloy | Cr | Mo or W | Fe | C | Co | Ni | Cb+Ta | Al | Others |
|---|---|---|---|---|---|---|---|---|---|
| Nickel-Base: | | | | | | | | | |
| N-1 | 13 | 5 | | .2 | | Bal. | 2 | 6 | Ti, B |
| N-2 | 10 | 12 | | .2 | 12 | Bal. | 1.0 | 5 | Zr, Ti, B |
| N-3 | 18 | 4 | | | 18 | Bal. | | 3 | Ti |
| N-4 | 10 | 3 | | .2 | 15 | Bal. | | 5.5 | Ti, B |
| Cobalt-Base: | | | | | | | | | |
| C-1 | 21 | 10 | | 1.0 | Bal. | | 9.0 | | Zr |
| C-2 | 21 | 11 | | .5 | Bal. | | 2 | | |
| Iron-Base: | | | | | | | | | |
| F-1 | 27 | | Bal. | .35 | | | | | |
| F-2 | | | Bal. | .2 | | | | | Mn |
| F-3 | 16 | | Bal. | .12 | | | | | |
| F-4 | 18 | | Bal. | .08 | | 10 | | | Ti |
| Copper-Base: | | | | | | | | | |
| Cu-1, Copper discs | | | | | | | | | ([1]) |

[1] Electrical Grade Copper.

TABLE B.—BEST PRACTICE SCHEDULE

| Variable | Nickel base | Iron base | Copper base | Cobalt base |
|---|---|---|---|---|
| Substrate Material | | | | |
| Prealloyed Material Composition, in Weight Percent. | 70 Fe, 30 Al / 70 Ni, 30 Al | 70 Fe, 30 Al | 70 Fe, 30 Al | 70 Fe, 30 Al. |
| Prealloyed Material, Size | −60 | −60 | −60 | −60. |
| Silicon Carbide, Size | −60 | −60 | −60 | −60. |
| Carrier, C.P. Grade | Ammonium bromide / Aluminum chloride | Ammonium bormide / Aluminum chloride | Ammonium bromide / Aluminum chloride | Aluminum chloride. |
| Reuse | −5 to 10 Times. Add 5 percent prealloy, 1 percent carrier for each reuse. | −5 to 10 Times. Add 5 percent prealloy, 1 percent carrier for each reuse. | −5 to 10 Times. Add 5 percent prealloy, 1 percent carrier for each reuse. | −5 to 10 Times. Add 5 percent prealloy, 1 percent carrier for each reuse. |
| Charge Proportions, in Weight Percent: | | | | |
| Prealloyed Material | 49.5 | 49.5 | 49.5 | 49.5. |
| Silicon Carbide | 49.5 | 49.5 | 49.5 | 49.5. |
| Ammonium Bromide | .8 | .2 | .5 | |
| Aluminum Chloride | .2 | .8 | .5 | 1.0. |
| Furnace Program | 1,700° F. / 18 hours | 1,600 to 1,975° F. / 16 hours | 1,550° F. / 16 hours | 2,000° F. / 12 hours. |

What we claim is:

1. In the process of diffusion coating metallic articles by embedding the article to be coated in prealloyed particulated charge material consisting essentially of aluminum with the balance substantially all at least one metal selected from the group consisting of iron and nickel and heating said charge material and contained articles at temperatures above about 1400° F. with the exclusion of air in the presence of halogen compound carrier material; the improvement which comprises incorporating particulated silicon carbide in mixture with the charge material prior to the heating thereof.

2. In the process of diffusion coating metallic articles by embedding the article to be coated in prealloyed particulated charge material consisting essentially of aluminum with the balance substantially all at least one metal selected from the group consisting of iron and nickel and heating said charge material and contained articles at temperatures above about 1400° F. with the exclusion of air in the presence of halogen compound carrier material, the improvement which comprises incorporating particulated silicon carbide in mixture with the charge material prior to the heating thereof, said silicon carbide constituting between 20 and 85 percent by weight of the aggregate of charge material, carrier and silicon carbide.

3. In the process of diffusion coating metallic articles by (1) embedding the article in prealloyed particulated charge material consisting essentially of from about 15 percent to about 37 percent by weight aluminum and the balance substantially all at least one metal selected from the group consisting of iron and nickel, and incidental impurities, and (2) heating the charge material and contained articles in the presence of at least one carrier material selected from the group consisting of ammonium halides, nickel halides, and aluminum halides, said heating being conducted with the exclusion of air at a temperature between about 1400° F. and 2200° F., the improvement which comprises admixing particulated silicon carbide with the charge material prior to the heating thereof, said silicon carbide constituting between 20 and 85 percent by weight of the aggregate of charge material, carrier and silicon carbide and said carrier material constituting between about 0.25 and 3 percent by weight of the aggregate of charge material, carrier and silicon carbide.

4. A metallic article having a protective coating of aluminum containing and silicon containing oxidation resistant materials formed by heating the articles in a mixture of particulated silicon carbide and particulated prealloyed charge material consisting essentially of 15 to 37 percent by weight aluminum and the balance substantially all at least one metal selected from the group consisting of iron and nickel and incidental impurities, said heating being conducted in the presence of at least one carrier material selected from the group consisting of ammonium halides, aluminum halides, and nickel halides at a temperature between 1400° F. and 2200° F. with the exclusion of air for a time sufficient to form the coating.

References Cited

UNITED STATES PATENTS

| | | | |
|---|---|---|---|
| 2,855,328 | 10/1958 | Long | 117—107.2 |
| 3,079,276 | 2/1963 | Puyear et al. | 117—107.2 |
| 3,096,160 | 7/1963 | Puyear | 29—197 |

ALFRED L. LEAVITT, *Primary Examiner.*

A. GOLIAN, *Assistant Examiner.*